United States Patent [19]
Crosslen et al.

[11] Patent Number: 5,205,195
[45] Date of Patent: Apr. 27, 1993

[54] OIL FILTER RECYCLER APPARATUS

[75] Inventors: John Crosslen, Saukville; John Tolentino, New Berlin; Gary Monroe, Jackson, all of Wis.

[73] Assignee: Frank Mayer & Associates, Grafton, Wis.

[21] Appl. No.: 722,153

[22] Filed: Jun. 27, 1991

[51] Int. Cl.⁵ ............................................. B23B 5/14
[52] U.S. Cl. ........................................ 82/92; 82/101; 30/418; 30/441
[58] Field of Search ............... 82/92, 46, 78, 70.1, 82/100, 100.1, 101, 168, 169; 30/101, 418, 441; 269/181

[56] References Cited

U.S. PATENT DOCUMENTS

| | | | |
|---|---|---|---|
| 2,189,341 | 2/1940 | Dumont | 30/101 X |
| 2,436,526 | 2/1948 | Olson | 82/169 |
| 3,520,218 | 7/1970 | Tolkmitt | 82/92 |
| 3,608,192 | 9/1971 | Hansel | 30/441 |
| 3,900,948 | 8/1975 | Kammeraad | 30/441 |
| 4,046,038 | 9/1977 | West | 82/101 |
| 4,066,270 | 1/1978 | Elkin | 82/169 X |
| 4,279,181 | 7/1981 | Birkestrand | 82/92 X |
| 4,569,510 | 2/1986 | Haramoto | 269/181 |
| 5,133,234 | 7/1992 | Ehlert et al. | 82/92 |

Primary Examiner—Z. R. Bilinsky
Attorney, Agent, or Firm—Nilles & Nilles

[57] ABSTRACT

An oil filter recycler for severing the casing of an automotive oil filter, for separating the filter into its components for recycling, and for removing engine waste oil for environmentally safe disposal, characterized by a turntable for rotating a cylindrically shaped filter about its' axis and a knife for severing the casing of the filter as it is rotated. The turntable is rotatable either manually or automatically. The knife is radially adjustable relative to the axis of the turntable. A releasable ratchet pawl spring biased for engagement with a rotatable threaded rod on a slidable knife holder provides for slidable, rotatable adjustment of the knife, and for quick release and retraction of the knife.

13 Claims, 6 Drawing Sheets

OIL FILTER RECYCLER APPARATUS

BACKGROUND OF THE INVENTION

This invention relates to a device for separating an automotive oil filter into its components for recycling, and further relates to the removal of engine waste oil from the filter for disposal in an environmentally safe manner.

Motor vehicles require periodic, regular replacement of the engine oil and replacement of the oil filter. A used oil filter has no further use on the motor vehicle and so it must be disposed of in some manner. The practice up to now has been to simply dispose of the filter along with the other refuse generated by a service station for ultimate disposal at a municipal landfill. Increasing concern over the environment, however, has drawn attention to the disposal of oil filters in two respects—recycling the metal parts and disposing the engine waste oil.

An ordinary automotive oil filter typically has a substantially cylindrical shape. The filter comprises a thin metal casing which forms the wall and one end of the cylinder, and a relatively thick metal plate on the other end. The base plate, which provides a rigid base to the filter, has a threaded central opening for attaching the filter to the motor vehicle. Inside the filter is a filter cartridge which consists of a cloth, paper or other soft synthetic filter material supported by two thin metal end plates and a thin metal central core.

The metal parts of an automotive oil filter are a valuable, recyclable resource. However, recycling processes require metals to be separated from other materials which would interfere with the recycling process or otherwise contaminate the end product. Due to the combination of different metals used to construct the filter, the synthetic filter material, and the engine waste oil trapped inside, an oil filter is not recyclable as a unit. The components must be separated from each other to have any value as a recyclable resource.

Regarding the problem of disposing engine waste oil, when an oil filter is removed from an automobile, waste oil is difficult to remove from the filter and so it remains trapped inside the filter. Over time some of the oil may seep out through the openings of the filter, thus raising the prospect of contamination of the landfill site and the groundwater below. Concern over the environment has led to efforts directed at recovering engine waste oil after it has been used and removed from the engine or crankcase of a motor vehicle for proper disposal or recycling. Some states are mandating by statute the recovery and recycling of engine waste oil and are restricting disposal of products containing engine waste oil, including oil filters. California and Wisconsin are examples of two states which now regulate the recovery, recycling and disposal of engine waste oil. For example, Section 159.15 of the Wisconsin Statutes mandates the establishment of engine waste oil collection facilities, and mandates the development of programs regarding the need for using recycled oil to maintain oil reserves and the need to minimize disposal of waste oil and products containing waste oil in ways harmful to the environment. The statute specifically requires businesses which sell automotive engine oil, and requires businesses which service and remove engine oil from motor vehicles, to maintain an engine waste oil collection facility for temporary storage of engine waste oil.

In California the State Legislation found that almost 100 million gallons of used automotive and industrial oil are generated each year in that state alone. The Legislature further found that, despite the fact that used oil is a valuable petroleum resource that can be recycled, significant quantities of used oil are wastefully or improperly disposed of by means which pollute the environment and endanger public health. For these reasons, California has mandated that used oil shall be collected and recycled to the maximum extent possible. See California Code, Public Resources, Sections 3460-3494.

SUMMARY OF THE INVENTION

The present invention provides an oil filter recycler apparatus for severing and separating an automotive oil filter into its principal components for recycling, and for removing engine waste oil for environmentally safe disposal.

Upon removal of a used filter from an automobile, a service station attendant places the filter on a rotatable turntable, which rotates the substantially cylindrical shaped filter about its axis. A retractable knife is adjusted up to and forced against the wall of the filter so as to protrude through the metal casing at a point approximately where the casing joins the metal base plate, and preferably in an area where a gap exists between the thick metal base plate of the filter and one of the metal end plates of the filter cartridge. By rotating the filter, the knife thus severs the casing along a line around the base of the filter. After the casing has been completely cut, the knife is released and retracted away from the filter. The knife is quickly and easily adjustable up to and away from the cutting position by a releasable ratchet pawl and threaded rod assembly.

The apparatus of the present invention has a means for automatically rotating the filter during the cutting process through the use of an electric motor and a gear drive assembly. Alternatively, a manual version allows the service attendant to manually rotate the filter, thus avoiding the need for a power source and avoiding the risk associated with the use of electrical devices near oil.

The apparatus of the present invention separates the metal casing, metal base plate and the inner filter cartridge of the filter by making a single cut around the base of the filter. The inner filter cartridge may be further separated by manually separating the two thin metal end plates, the metal central core and the filter material. The constituent parts may be sorted, rinsed of residual engine waste oil, and sent on for further processing as a reusable resource. Engine waste oil is fully removed from the filter and collected for proper disposal.

The principal objects of the invention are therefore to provide a device to sever the casing of an automotive oil filter; to separate for recycling the metal components of an oil filter, including the base plate, the casing, and the end plates and central core of the filter cartridge; and to remove for environmentally safe disposal the engine waste oil trapped in the oil filter.

Other objects and advantages of this invention will become apparent from the following description taken in connection with the accompanying drawings which set forth, by way of illustration and example, certain embodiments of this invention.

BRIEF DESCRIPTION OF THE DRAWINGS

The drawings, which constitute part of this specification and include exemplary embodiments of the present invention, include the following.

DETAILED DESCRIPTION

Figure 1:
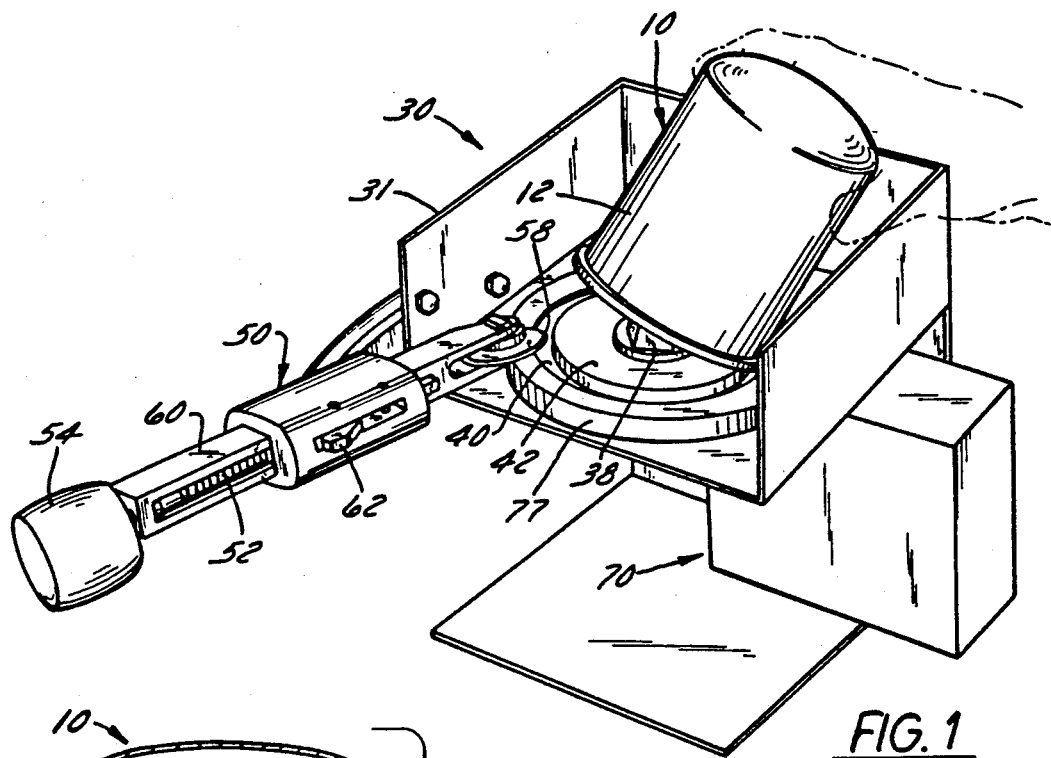
FIG. 1 is a perspective view of the invention as a person is about to place an oil filter on it.
Figure 2:
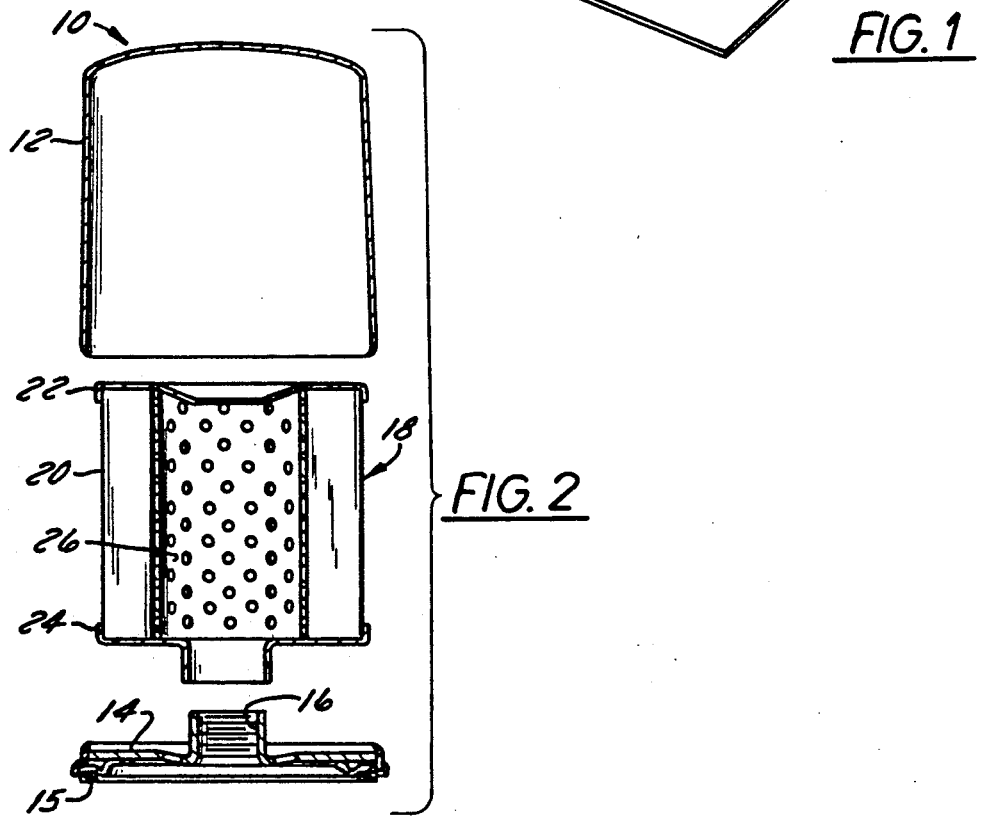
FIG. 2 is a vertical, exploded sectional view of an automotive oil filter which has been severed and separated into its' principal components.

As shown in FIG. 2, a typical automotive oil filter 10 comprises essentially a thin metal casing or shell 12, a thick metal base plate 14, and a filter cartridge 18. The casing 12 forms the wall and one end of the substantially cylindrical shaped filter 10 and the circular base plate 14 forms the other end of the cylinder. The casing 12 and base plate 14 are crimped together. The base plate 14 has a threaded central opening 16 and a gasket 15 for attaching and sealing the filter 10 on an automobile. The filter cartridge 18 consists of a filter material 20 supported between upper and lower metal end plates, 22 and 24, respectively, and a metal central core 26. A narrow gap 28 exists between the lower end plate 24 of the filter cartridge 18 and the base plate 14 of the filter as shown in FIG. 4.

Figure 3:
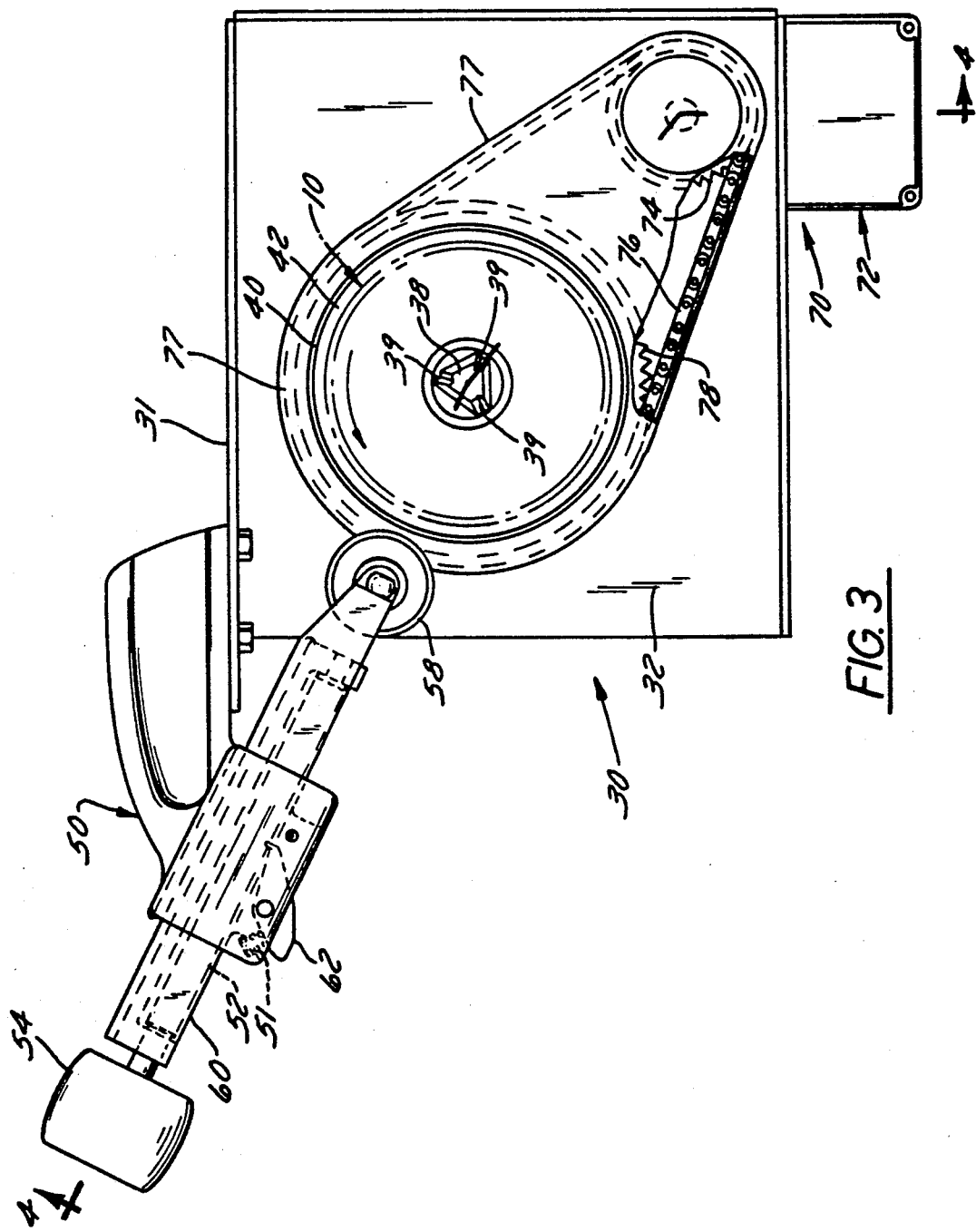
FIG. 3 is a top view of a first embodiment of the invention, certain parts being shown as broken away for clarity, which has an electric motor drive assembly for automatically rotating the filter.

The oil filter recycler 30 comprises essentially a means for rotating the filter 10 about the axis of its' cylindrical shape and a knife means for severing or cutting the wall of the casing as the filter 10 is rotated. Referring to FIGS. 3 and 4, a first embodiment of the device 30 comprises a base frame 32 which supports a turntable 40 for rotating the filter 10. An upwardly extending shaft or protuberance 38 projecting out from the center of the turntable 40 fits into the threaded central opening 16 of the base plate 14 on the filter 10. The filter 10 is placed over the protuberance 38 so that the axis of the cylindrical shape of the filter is aligned with the axis of the circular turntable 40.

Figure 4:
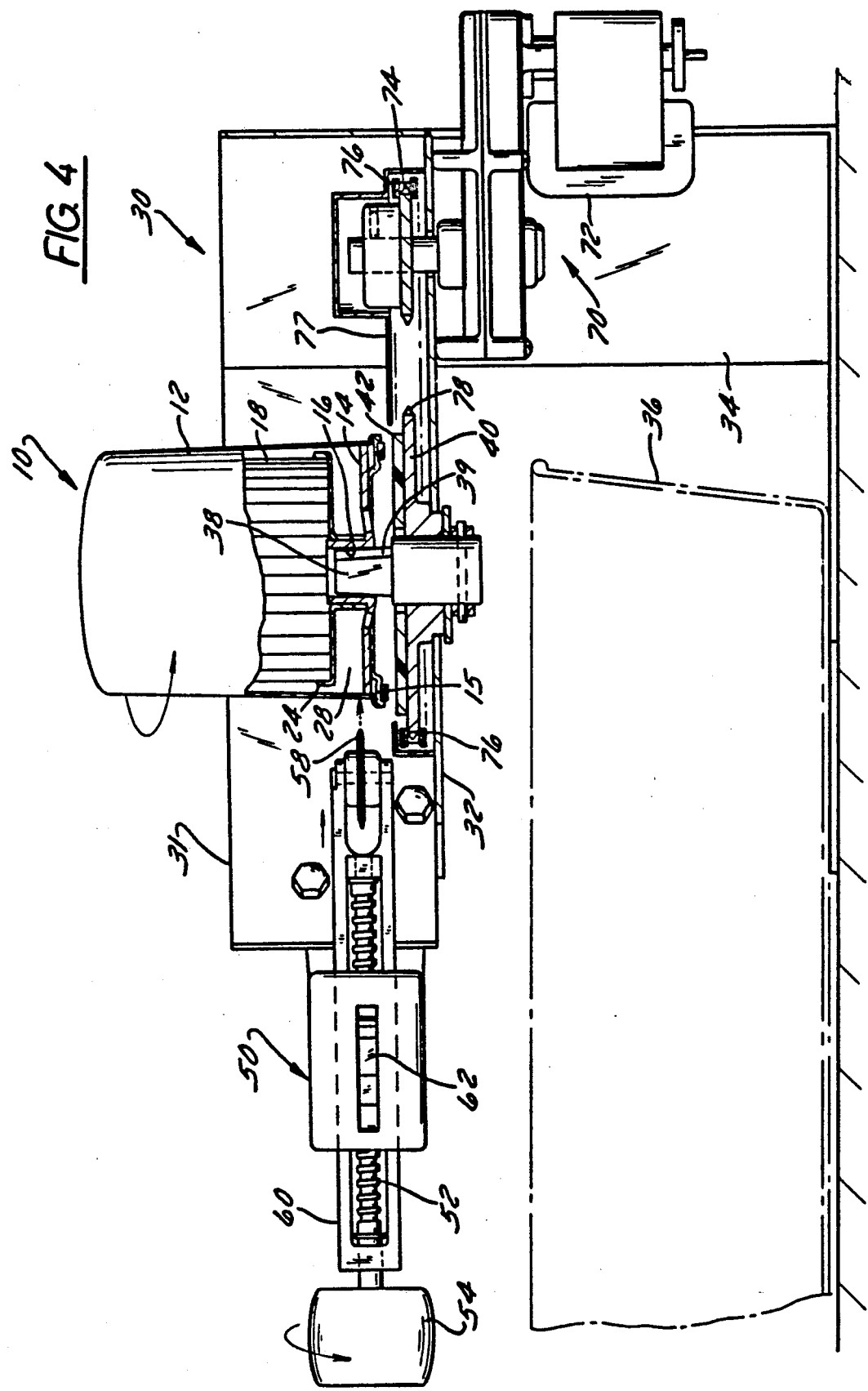
FIG. 4 is a cross-sectional view of the invention shown in FIG. 3 taken generally along line 4—4 in FIG. 3.

A means for automatically rotating the filter 10 is shown in FIGS. 3 and 4. In this embodiment 30, the turntable 40 and protuberance 38 are connected and rotate together. In this embodiment, the protuberance 38 is generally tapered and preferably has upwardly and inwardly inclined wedge blades 39 wedgingly engageable with the central opening 16 of the filter 10 to rotate it. FIG. 3 shows three such blades 39 which have the effect of digging into and locking against the edge of the central opening 16 when the filter 10 is rotated in one direction with respect to the turntable 40 (counter-clockwise in FIG. 3), and the blades 39 have the effect of disengaging and slipping along the central opening 16 when the filter 10 is rotated in the opposite direction with respect to the turntable 40. Thus, when the turntable 40 is activated to automatically rotate the filter 10 to cut the casing 12, the wedge blades 39 essentially grab hold of and force rotation of the filter 10. After the cutting process is completed, a person may easily remove the now severed filter 10 by rotating it slightly in the opposite direction to release it from the blades 39. A slip disk 42 on the turntable 40 allows for rotation of the filter 10 relative to the turntable 40.

A drive assembly 70 automatically rotates the turntable 40 during the cutting process. The drive assembly 70 includes an electric motor 72 for turning a drive gear 74 and a chain 76 engaged with the drive gear 74 and engaged with gear teeth 78 around the periphery of the turntable 40. The turntable 40 and drive gear 74 are on the upper side of the base frame 32 and the motor 72 is below. A cover 77 over the drive assembly 70 protects the operator from pinch-points between the chain 76 and gears 74 and 78. The electric motor 72 operates off of an ordinary 110 volt AC power source.

Figure 5:
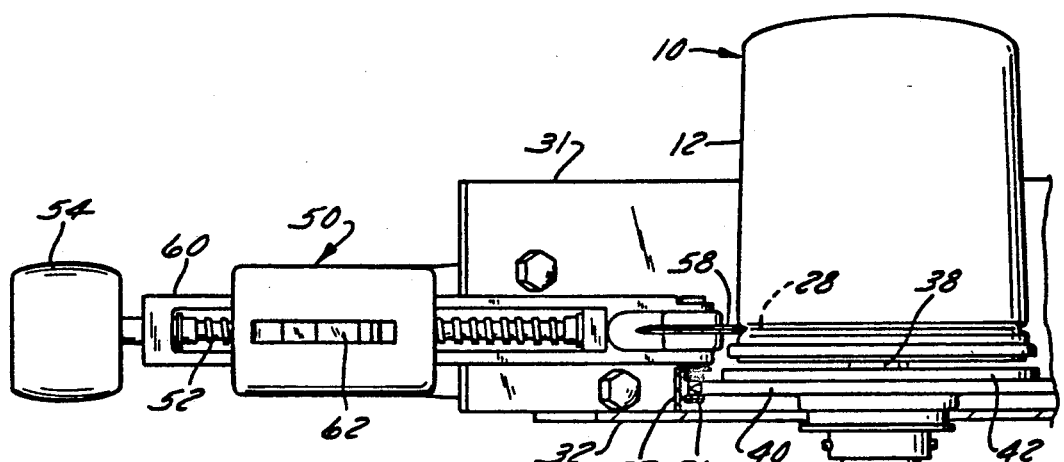
FIG. 5 is a side view of the knife assembly shown in the cutting position.
Figure 6:
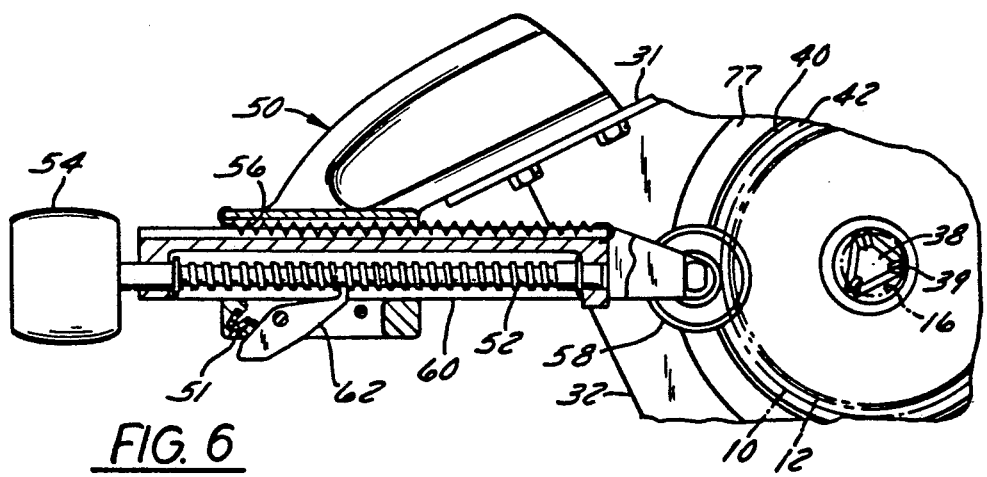
FIG. 6 is a top fragmentary view partially in section of the knife assembly shown in FIG. 5.
Figure 7:
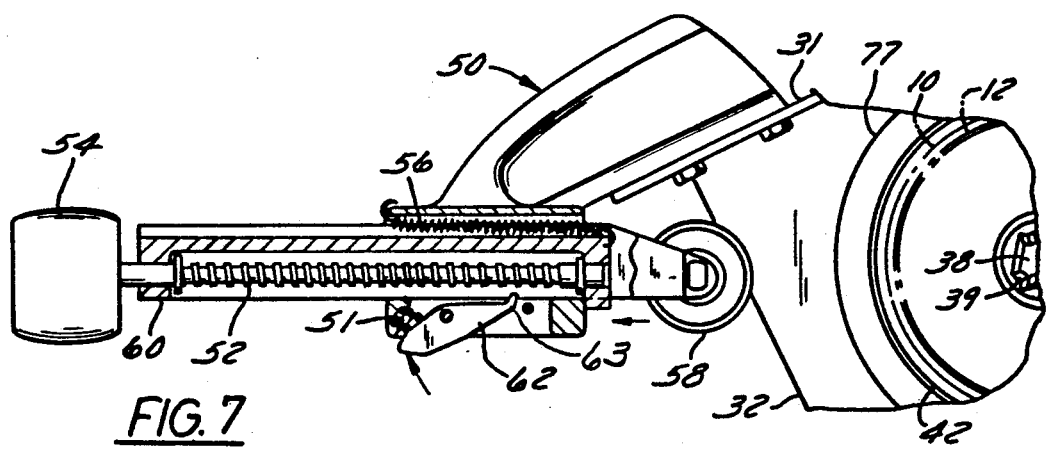
FIG. 7 is a view similar to FIG. 6, but showing the knife assembly in the retracted position.

The base frame 32 has a vertical flange 31 for supporting a knife assembly 50 in a position whereby a knife 58 is protrudable through the wall of the filter casing 12 at a point just slightly above where the casing 12 joins the base plate 14 of the filter, preferably in the gap 28 between the base plate 14 and the lower end plate 24 of the filter cartridge 18. As shown in FIGS. 5, 6 and 7, the knife assembly 50 includes the knife 58 which is radially adjustable toward and away from the axis of the filter 10, which corresponds to the center or axis of the turntable 40. The knife assembly 50 also includes a slidable knife holder 60, a rotatable threaded adjusting rod 52 on the holder 60, and a releasable ratchet pawl 62.

The ratchet pawl 62 is biased by spring 51 for engagement by its tooth 63 (FIG. 7) with the worm-gear threads of the adjusting rod 52 so that, in response to a lateral force applied to the end of the knife assembly 50, the knife holder 60 slides toward the casing 12 of the filter 10; and so that rotation of the threaded rod 52 in one direction slides the knife holder 60 toward the filter 10 with sufficient force to cause the knife 58 to protrude through the casing 12 of the filter 10; and so that rotation of the threaded rod 52 in the other direction slides the knife holder 60 away from the filter 10. The knife holder 60 is biased by spring 56 to automatically retract away from the filter 10 upon release of the ratchet pawl 62.

Upon placing a filter 10 on the turntable 40 of the device 30, a person may press against a knob 54 on the end of the knife assembly 50 to provide for a quick gross adjustment of the knife 58 u against the casing 12 of the filter 10. Rotation of the knob 54 forces the knife 58 through the casing 12. Actuation of the motor 72 causes the wedge blades 39 on the protuberance 38 to engage and rotate the filter 10, in turn causing the knife 58 to sever the casing 12 along a line adjacent to the base plate 14 of the filter. Pressing the ratchet pawl 62 releases it from the threaded rod 52 thereby retracting the knife 58 from the filter 10.

Figure 8:
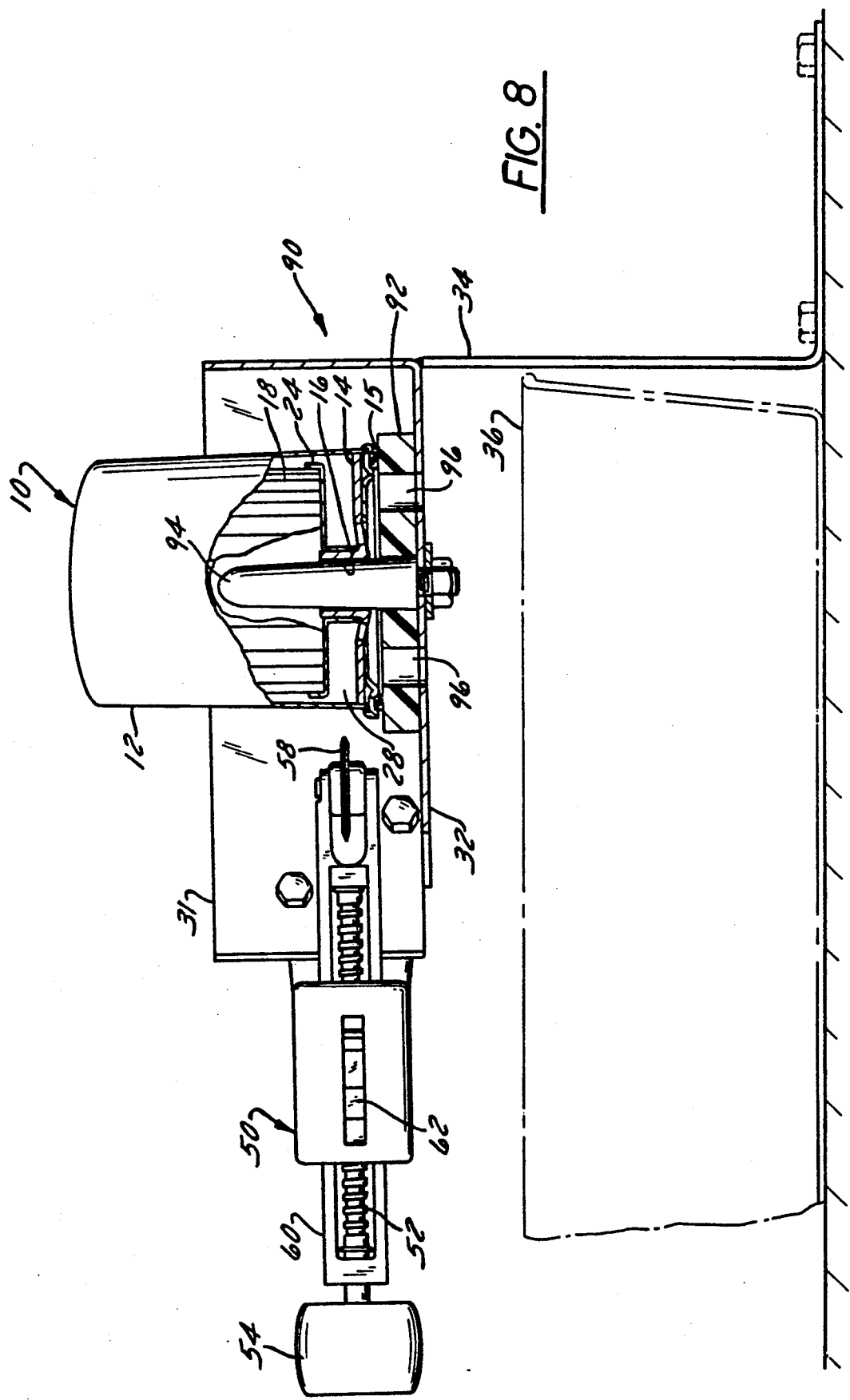
FIG. 8 is a side view of a second embodiment of the invention which has a manually rotatable turntable for rotating the filter partially in section with portions broken away for clarity.
Figure 9:
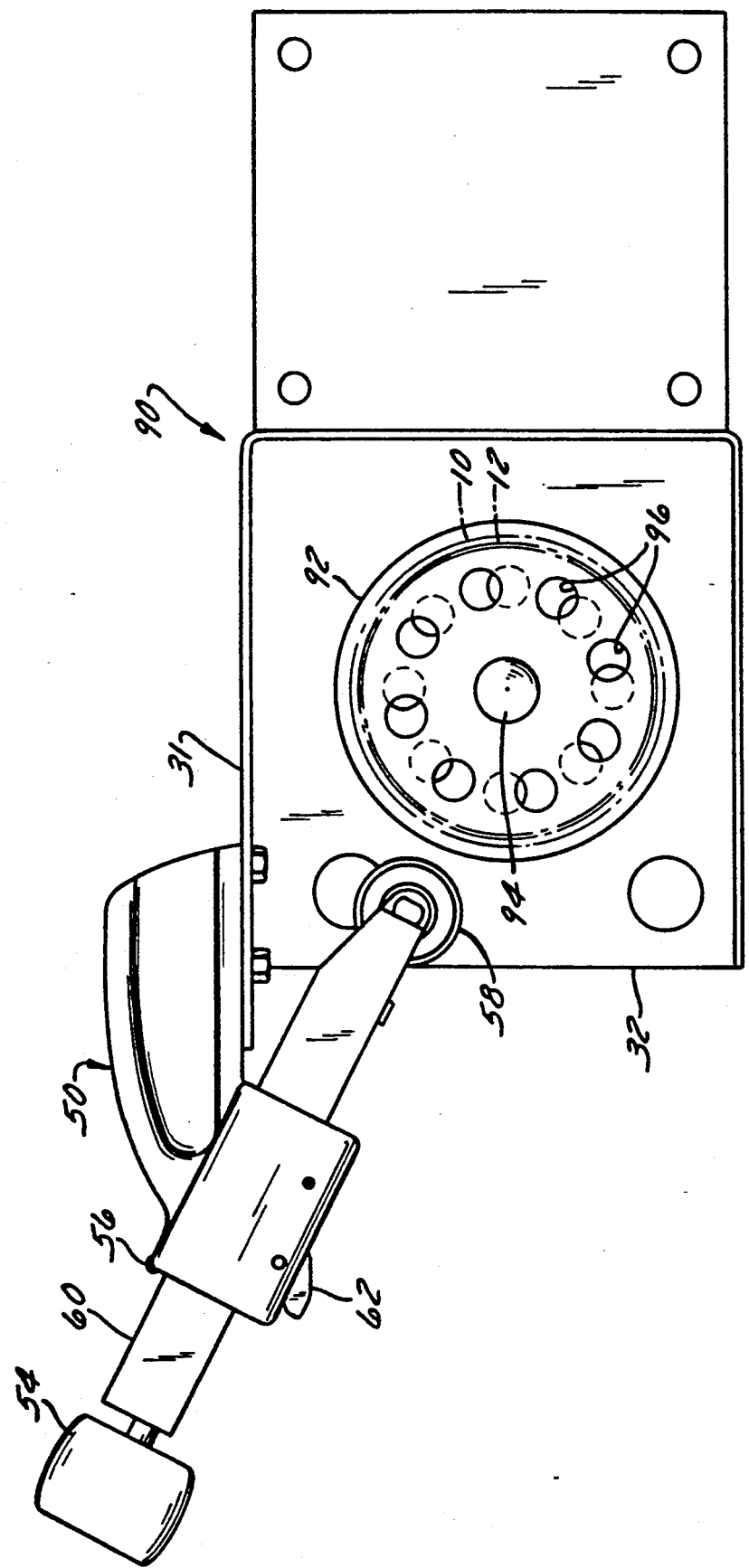
FIG. 9 is a top view of the second embodiment of the invention shown in FIG. 8.

FIGS. 8 and 9 shows a manually rotatable embodiment of the invention 90. In this case, the turntable 92 is a freely rotatable disc slipped over a fixed protuberance 94 in the form of a shaft which tapers upwardly and inwardly to provide a wedging action. The filter 10 is again placed on the device 90 so that the gasket 15 on the base plate 14 rests flat on the turntable 92 and so that the shaft or protuberance 94 projects wedgingly into the central opening 16 of the filter 10. The protuberance 94 is fixed to the base frame 32 of the device 90 to simply align and maintain the filter 10 in proper position during the cutting process. The surface of the protuberance 94 on this device 90 is smooth rather than having blades. The filter 10 is rotated about its axis on the turntable 92 by a person grabbing the top of the filter 10 and rotating it by hand. The base frame 32 has a vertical riser 34 to provide a space for a container 36 beneath the device 90. Oil drain orifices 96 in the turntable 92 and in the base frame 32 allow oil dripping from the filter 10 to be collected in the container 36 below the frame. The knife assembly 50 is constructed and operates the same as stated above.

It is to be understood that the embodiments disclosed above are merely exemplary of the invention which may be embodied in various forms. For instance, the drawings show a rotatable circular knife 58, but a straight blade would also satisfactorily sever the casing 12 of the filter 10. The knife 58 is also adjustable along a linear path extending radially from the axis of the filter (or from the axis of the turntable), but an alternative construction may provide a knife assembly which swings the knife into and out of the cutting position. Also, the base frame 32 has a vertical riser 34 to provide an elevated platform for the turntable 40,92 so that oil from the filter 10 may drip into a container 36 below, but one may vary the specific construction of the base frame.

Therefore, specific structural and functional details disclosed above are not to be interpreted as limiting, but merely as a basis for the claims and for teaching one skilled in the art to variously employ the present invention in any appropriately detailed structure. Changes may be made in the details of construction, arrangement and operation of the invention without departing from the spirit of the invention, especially as defined in the following claims.

What is claimed is:

1. An apparatus for severing the casing of an automotive oil filter, the filter having a substantially cylindrical shape and being of the type which includes on one end thereof a circular metal base plate, a casing forming the wall and other end of the cylinder, and a filter cartridge contained therein, the apparatus including:
    a turntable for rotating the filter about the axis of its cylindrical shape;
    a knife for severing the casing as the filter is being rotated, with the knife being radially adjustable toward and away from the axis of the turntable, and the knife being a rotatable circular blade protrudable through the casing of the filter;
    a slidable knife holder for supporting the knife;
    a rotatable threaded rod on the slidable knife holder; and
    a ratchet pawl releasably engageable with the threaded rod.

2. An apparatus for severing the casing of an automotive oil filter, the filter having a substantially cylindrical shape and being of the type which includes on one end thereof a circular metal base plate, a casing forming the wall and other end of the cylinder, and a filter cartridge contained therein, the apparatus including:
    a rotatable turntable;
    a protuberance projecting out form the center of the turntable and insertable into a central opening in the circular metal base plate of the filter;
    knife means for severing the casing as the filter is being rotated;
    gear teeth around the periphery of the turntable;
    a drive gear;
    a chain engaged with the drive gear and engaged with the gear teeth of the turntable; and
    an electric motor for turning the drive gear.

3. The apparatus according to claim 2, wherein the apparatus include a base frame supporting the protuberance and supporting the turntable, with the base frame and turntable each having apertures therein to permit engine waste oil to drain out of the filter, through the apertures and into a container below the base frame.

4. The apparatus according to claim 2, wherein the protuberance further includes angled wedge blades fixed to the turntable, the blades being engageable with the central opening of the filter such that, as the turntable rotates in one direction relative to the filter the blades have a tendency to dig into the edge of the central opening of the filter, and such that as the turntable rotates in the opposite direction relative to the filter the blades have a tendency to release from the edge of the central opening of the filter.

5. The apparatus according to claim 2, wherein the knife means for severing the casing of the filter includes a knife radially adjustable toward and away from the axis of the turntable, and the knife being protrudable through the casing of the filter.

6. The apparatus according to claim 5 wherein the knife is a rotatable circular blade.

7. The apparatus according to claim 5, wherein the knife means further includes:
    a slidable knife holder for supporting the knife;
    a rotatable threaded rod on the slidable knife holder; and
    a ratchet pawl releasably engageable with the threaded rod.

8. The apparatus according to claim 7, wherein the ratchet pawl is spring biased for engagement with the threaded rod so that in response to a lateral force the knife holder is slidable toward the casing of the filter, and so that rotation of the threaded rod in one direction causes the slidable knife holder to advance the knife toward the filter with sufficient force to protrude through the casing thereof.

9. The apparatus according to claim 8, wherein the slidable knife holder is spring biased to be automatically retractable away from the filter upon release of the ratchet pawl from the threaded rod.

10. An apparatus for cutting and separating an automotive oil filter into recyclable parts, the filter being of a substantially cylindrical shape and of the type which includes a casing forming the wall and one end of the cylindrical shape, and a metal base plate forming the other end thereof, the metal base plate having a central opening therein, and the filter including an interior filter cartridge, the device comprising:
    a turntable;
    a protuberance at the center of the turntable insertable into the central opening of the metal base plate of the filter;
    the turntable being rotatable so as to rotate the filter about the axis of the cylindrical shape thereof;

a knife radially adjustable relative to the axis of the turntable;

gear teeth around the circumference of the turntable;

a drive gear;

a chain engaged with the drive gear and engaged with the gear teeth of the turntable; and an electric motor for rotating the drive gear.

11. The apparatus according to claim 10, wherein the protuberance includes angled wedge blades engageable with the edge of the central opening of the metal base plate of the filter such that the blades have the effect of digging into and locking against the edge when the blades are rotated in one direction relative to the filter and the blade release from the edge when rotated in the opposite direction relative to the filter.

12. The apparatus according to claim 10, further including:

a slidable knife holder with the knife connected to one end thereof;

a worm gear on the knife holder;

a releasable ratchet pawl; and the worm gear being slidably and rotatably engageable with the ratchet pawl.

13. The apparatus according to claim 12, wherein the knife is a rotatable circular blade.

* * * * *